Dec. 11, 1962 G. NEIDL 3,067,960
PUMPING AND COMMINUTING MACHINE
Filed Dec. 16, 1959 4 Sheets-Sheet 1

INVENTOR
G. Neidl

By: Glascock Downing & Seebold
Attys.

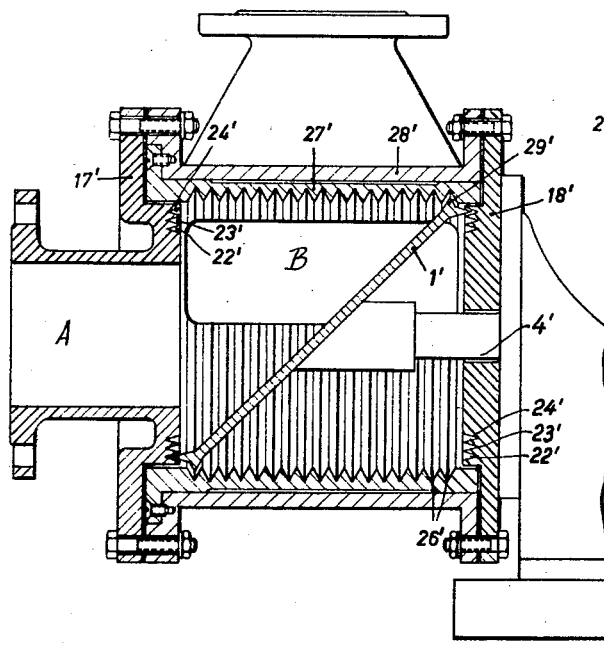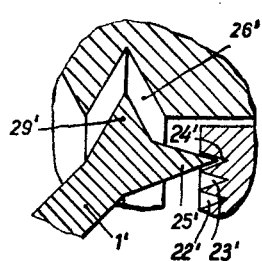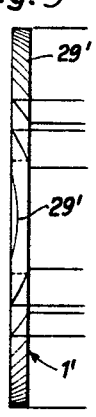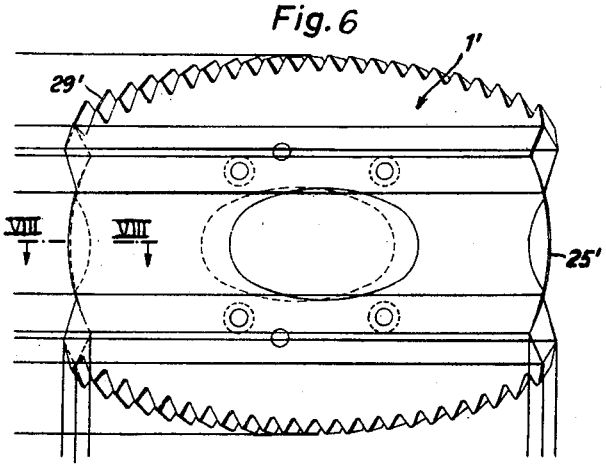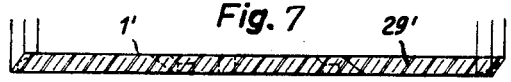

Dec. 11, 1962 G. NEIDL 3,067,960
PUMPING AND COMMINUTING MACHINE
Filed Dec. 16, 1959 4 Sheets-Sheet 3
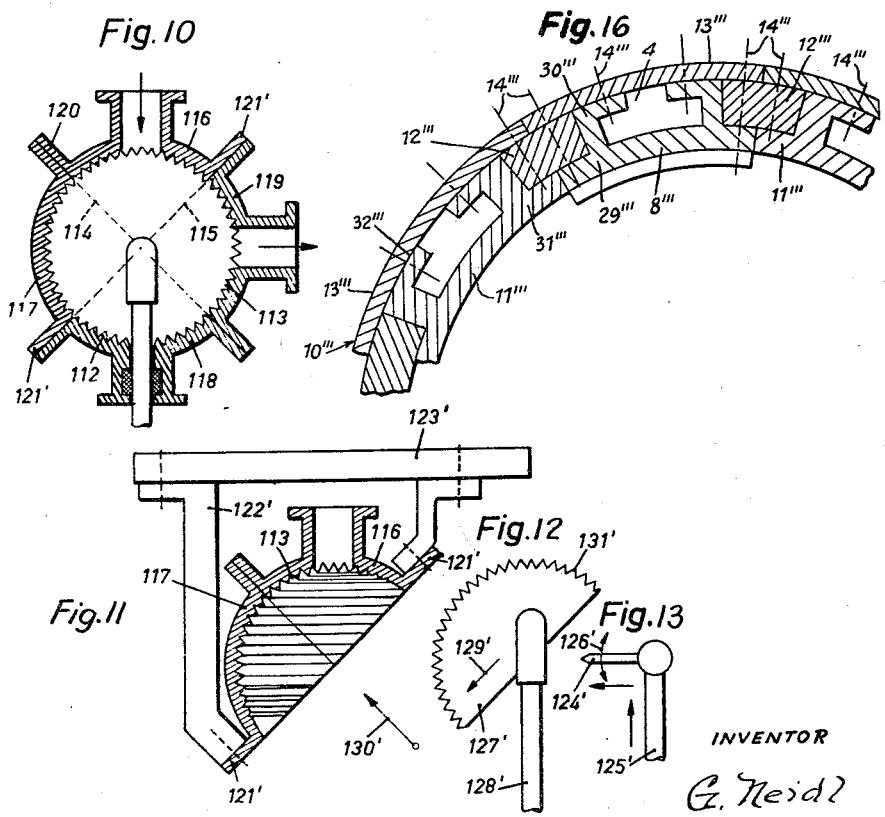
INVENTOR
G. Neidl Dec. 11, 1962 G. NEIDL 3,067,960
PUMPING AND COMMINUTING MACHINE
Filed Dec. 16, 1959 4 Sheets-Sheet 4

INVENTOR
G. Neidl
By: Glascock Downing & Seebold
Attys.

United States Patent Office

3,067,960
Patented Dec. 11, 1962

3,067,960
PUMPING AND COMMINUTING MACHINE
Georg Neidl, Uferstrasse 6, Berlin N65, Germany
Filed Dec. 16, 1959, Ser. No. 859,887
Claims priority, application Germany Dec. 29, 1958
4 Claims. (Cl. 241—255)

My present invention relates to a machine for pumping and comminuting a fluid with or without simultaneous homogenization thereof. Fluids of the character referred to include slurries, sludges and like suspensions of solid matter in a liquid vehicle as well as viscous liquids.

Such apparatus embodying the present invention can be made so large as to be suitable for the comminution of bales of waste paper, uncut sugar cane and uncut timber logs.

These machines can also be used for the production of fibers by introducing into a tank a raw material together with a liquid for suspending and digesting it and by then using a machine according to the invention for circulating and simultaneously subdividing the material until the mixed and suspended matter has the desired fineness of fibre. By then withdrawing the mixture and drying it a fine floccular fibrous product can be obtained.

It is also contemplated, according to the invention, to provide apparatus of the character described adapted to make use of a raw material consisting of synthetic fiber rags, such as synthetic fiber waste, and woven or knitted fabrics. For instance, hosiery rejects from the hosiery knitting industry or, generally, any kind of reject which may arise in the manufacture of man-made fiber goods, or any manner of waste arising from the production of synthetic fiber materials are in principle capable of undergoing comminution in apparatus according to the invention. Moreover, rags of natural organic fiber, wood chips, waste paper, or waste arising from the production of hardboard and the like, or even cotton fibers are suitable as raw materials.

The fiber product which is obtained, has the form of wool and can be directly applied to further uses. For instance, the fibrous product may be employed for the making of filters. It is also applicable to the production of gun cotton, dynamite or blasting gelatine, the production cost being reduced because waste synthetic fibers can be used as raw materials instead of the expensive organic fibers such as linters, cellulose and the like hitherto used. If a binding medium such as glue, cement with water and gravel, a plastic and so forth is added to the fibrous product, the mixture can be processed into blocks, bricks, tubes or plates which, after having set, are outstandingly suitable as structural materials and, particularly, as thermal and acoustic insulation. An important advantage of the present apparatus is that, depending upon the period of circulation by pumping and the intensity of the treatment, the process can be appropriately controlled for the production of fibres of a desired length, since the fibres of the raw material are shortened and reduced in length in the circulating machine while the slurry is homogenized.

The fibrous product obtained by a machine or apparatus according to the invention can also be worked into felts, edgings, papers, pavings, carpets and so forth. Moreover, a normal cement mix can be replaced by a cheaper synthetic fiber cement obtained by mixing the synthetic wool obtained from the apparatus according to the invention with cement, water and/or sand and/or gravel and forming this composition into plates, blocks, bricks, tubes and the like.

A fibrous slurry obtained by the apparatus according to the invention can be used for making large-area sheet-like products such as paper, cardboard, fiber panels and so forth even though the raw materials from which the fibrous slurry is made consists of synthetic fibers, especially waste. For forming the sheet-like products binders are added and the resultant web is submitted to subsequent mechanical or chemical processing.

Initially, a machine according to the invention may be first used to circulate a liquid such as water, cement powder being gradually added to serve as a binding agent for the sheet-like material that is to be made, until the pumped water assumes the consistency of a thick cement slurry. This method produces a much more homogeneous mixture than that obtainable in one of the mixing machines hitherto conventional in the building trade. This applies quite generally to mortars of any description. The cement slurry as such is already a valuable product for the preparation of known building materials.

Whilst the pumping system continues to run, the raw fiber material, consisting for instance of synthetic fiber rags and the like, is gradually introduced into the tank through which the water/cement mixture travels. Upon repeatedly circulating through the pumps of the present invention, the fiber material is shredded and reduced to the required fineness of fiber and intimately mixed with the slurry. Naturally, the cement, water and synthetic fiber may be circulated together in such a manner that the cement slurry and the reduced fiber material are produced simultaneously.

It is also possible to process the synthetic fiber raw material into a synthetic fiber wool in a special plant and then to introduce this wool into a tank of that plant in which the binding agent for producing the sheet-like material, e.g. the cement, has been prepared and intimately mixed into a uniform and homogeneous cement/water slurry by repeated recirculation through the pumping machine, said slurry being then re-pumped through the system together with the added wool. Since not only the cement/water mixture but also the fibrous additive, whether in the form of rags or in the form of a previously prepared synthetic fiber wool, passes through the comminuting and pumping machine several times, the final mixture will be very intimately mixed and homogenized.

An important object of the invention is therefore to construct machines or apparatus capable of carrying out the processes just described.

A more specific object of my invention is to provide an improved combined comminuting and pumping apparatus of the character described.

According to a feature of this invention, the apparatus comprises an oblique rotor plate rotating in a hollow body member and provided with teeth fitting into grooves in the body member while further teeth on the ends of the rotor project into grooves in end plates at each extermity of the body member. Advantageously, the teeth on the rotor comb axially aligned rows of teeth fixed inside the hollow body member.

According to another aspect of the invention, the combined comminuting and pumping apparatus has an oblique rotor plate with teeth fitting into annular grooves in the formed hollow body member and is constructed in such a fashion that its efficiency is improved above that of previously known comminuting devices.

The above and other objects, features and advantages of the present invention will become more readily apparent from the following description, reference being made to the accompanying drawing in which:

FIG. 3 is an axial cross-sectional view of a machine casing or hollow pump body member with its impeller disk;

FIG. 4 is a fragmentary cross-sectional view drawn to enlarged scale, showing a detail of the pump, body member and the impeller teeth cooperating with one of the peripheral grooves in this member or casing and one of the annular grooves in the end or cover plate thereof;

FIG. 5 is an end view of the shorter side of the impeller, showing the teeth machined into its edges;

FIG. 6 is a plan view of the impeller or rotor showing the teeth;

FIG. 7 is a side view of the longitudinal edge of the impeller;

FIG. 8 is ac ross-sectional detail view taken along the line VIII—VIII of FIG. 6;

FIG. 10 is an axial cross-sectional view of a machine with a circular serrated or toothed impeller and a hollow body member forming a spherical chamber with corresponding grooves;

FIG. 11 is a fragmentary cross-sectional view of a hollow body member mounted in a lathe chuck;

FIG. 12 is a plan view of a disk-shaped cutter for machining the grooves in the body member;

FIG. 13 is a view similar to FIG. 12 of another cutting tool for machining the grooves;

FIG. 16 is a fragmentary axial cross-sectional view of the machine casing, taken along the line XVI—XVI of FIG. 14.

The basic construction of the various embodiments of the present invention is best seen from FIG. 3 in which 27' and 28' denote a hollow body with inlet and outlet orifice means A and B respectively, and 1' denotes an oblique rotor plate or impeller mounted on a shaft 4'. The inlet orifice lies along the axis of rotation of the rotor 4' whereas the outlet orifice B is provided along the inner periphery of the body.

Figure 1:
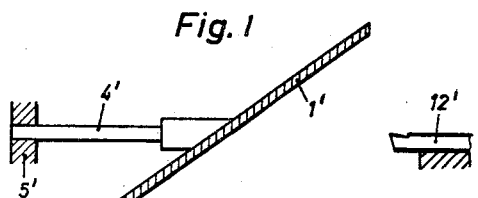
FIG. 1 is a side-elevational view of an oblique rotor plate or impeller of a mixing and comminuting pump according to the invention.
Figure 2:
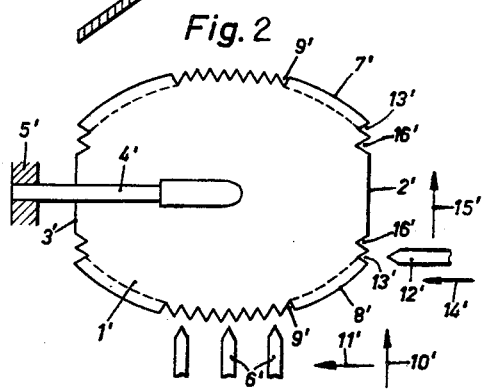
FIG. 2 is a plan view of the impeller.
Figure 9:
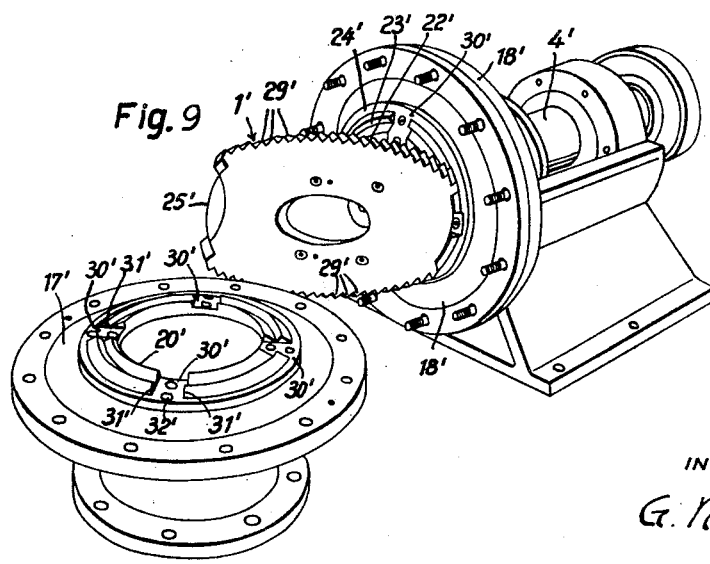
FIG. 9 is a perspective view of a further embodiment showing the impeller or rotor after one end plate and the cylindrical part of the body or casing have been removed.

The production of the impeller or oblique rotor illustrated in FIGS. 1–9 is based upon the use of an elliptical disk-shaped blank 1' from which segments are cut away along chords 2', 3' (FIG. 2) extending across the narrower ends of the ellipse. The disk-shaped blank 1' is then mounted obliquely on a shaft 4', as shown in FIGS. 1 and 2, and then clamped in a three-jaw chuck schematically shown at 5' in a lathe (not otherwise illustrated). A cutting tool 6' engages the two arcuate sides of the elliptical disk and teeth 9' are cut into these sides, the tool being fed transversely (i.e. in the direction of arrow 10').

When the toolholder and its cutting tool 6' have been withdrawn, the toolholder is longitudinally displaced (in the direction of arrow 11') by the pitch of one tooth and again fed towards the edges 7', 8' of the blank, thereby machining the two successive teeth 9' in the opposite edges of the elliptical blank. This process is repeated until the entire length of the two sides 7', 8' has thus been provided with teeth. In the drawing only eight complete teeth in the center are shown.

A cutting tool 12' is now employed at the chordal edges 2', 3' of the blank 1' and two identations 13' are machined by longitudinal feeding of the tool 12' (i.e. in the direction 14'). After having thus machined the two indentations 13' the tool 12' is transversely displaced by the pitch of one indentation and the two successive indentations 16' are machined. It will be understood that the angular shape of the indentations 13' and 16' shown in FIG. 2 need not be the shape of such indentations in practice, the indentations in the drawing being shown diagrammatically.

According to the invention, the serrations which are generated by machining indentations 13', 16' into the short edges of the elliptical blank are intended to engage annular grooves of corresponding shape in the internal surfaces of the cover or end plates of the machine. To this end the inner surfaces 17' and 18' (FIG. 3) of the cover or end plates are provided with grooves of triangular cross-section shown at 22', 23' and 24', which thus form annular ridge-like elevations between them.

In the embodiment illustrated in FIGS. 3 and 4 the casing is shown with a rotor disk 1' of the kind shown in FIG. 1 mounted in its interior chamber. The inner faces 17', 18' are each provided with three grooves 22', 23' and 24'. An acuminate portion 25' on the short edge of the impeller disk 1' projects into groove 24', which has the largest diameter, whereas the grooves 26' in the liner 27' of the machine casing 28', into which the liner has been inserted, receive the teeth 29' of the impeller disk 1'. Liner 27' forms with casing 28' the body of the device. For the purpose of greater clarity only one such acuminate portion 25' engaging the corresponding groove 24' is illustrated in FIGS. 3 and 4, whereas in actuality there may be two further pointed elements below element 25' adapted to be received by the two inner grooves 23' and 22'. The teeth, ribs and grooves need not be of triangular section. They may be rectangular, square, arcuate or of other cross-section.

Conveniently, radial gaps 30' (FIG. 9) may be provided in cover plate 17' as well as in cover plate 18' to interrupt the annular grooves 22', 23' and 24'. These radial interruptions materially improve the tearing and size-reducing action of the machine. This is due to the fact that the edges 31' which are formed at the intersections of the gaps 30' with the annular grooves 22' 23', 24' effect with the teeth of the rotor a shearing of the material when the toothed disk revolves. The radial gaps have the further advantage that holes 32' for countersunk mounting screws can be located at these gaps. The plates 17' and 18' form the terminal wall portions at the axial extremities of the pumping chamber.

In the embodiment shown in FIG. 10 the casing or body housing is a hollow sphere, whereas the impeller is a serrated disk of generally circular configuration, the teeth 112 of the disk cooperating with corresponding annu.ar grooves 113 machined into the internal surface of the casing either with or without any substantial clearance. To permit the serrated disk to be inserted into the casing, the latter is divided along two intersecting planes 114, 115 into four quarter sections 116, 117, 118, 119 which are bolted together by pairs of flanges 120, 121'. Parts of these sections function as the grooved end plates or terminal wall portions of the chamber.

For the purpose of machining the annular grooves 113 (FIGS. 11 and 13) two such quarter sections, e.g. those designated 116 and 117, are affixed by means of clamping brackets 122' to the faceplate 123' of a lathe. The cutting tool 124' which, as shown in FIG. 13, is held in a toolholder 125' on a slide not further illustrated, then is engaged in the rotating workpiece and one of the annular grooves 113 is machined into the interior. The tool 124' is then withdrawn, indexed as indicated by the double arrow 126' in the one or other direction by the pitch of a serration, and the next groove is then machined into the casing. This is repeated until all the required grooves have thus been machined into one half of the casing, as shown in FIG. 11. The other half of the casing is finally machined in the same way.

In yet another divided hollow spherical casing, which is not formed with flanges 120, a cutting tool in the shape of a semicircular disk 127' (FIG. 12) supported by a toolholder 128' on a slide (not shown) is used to machine several annular grooves 113 in a single operation by introducing the semicircular disk-shaped cutting tool into the hollow interior of the revolving hemisphere in the manner indicated by the two arrows 129' and 130'. The teeth 131' of the cutting tool form the annular grooves 113, but in the vicinity of the flanges 121' no grooves at all will be formed and the profiles of adjacent grooves will be incomplete, since fully developed grooves are cut out only in the central part of the hemisphere. This is due to the fact that only a tool presented to the work in the manner indicated in connection with tool 124' is capable of undercutting, this being impossible when a semicircular cutting tool such as that illustrated by 127' is employed.

To prevent only partially developed grooves from being thus generated, it is preferred to use an impeller disk having a circular or elliptical shape with portions cut off along symmetrical opposite chords, and rotating in a flattened spherical or ellipsoidal casing. The flat portions may then be located in the region of the inlet orifice and in the region of the stuffing box of the shaft. In such a case the grooves in the casing can be machined by introducing the semicircular cutter disk into the halves of the casing in the direction indicated by the two arrows 132' and 133'. The parting plane must then, of course, pass through the center of the inlet orifice and through the stuffing box, and the flanges 134' and 135' must be located in this plane.

Figure 14:
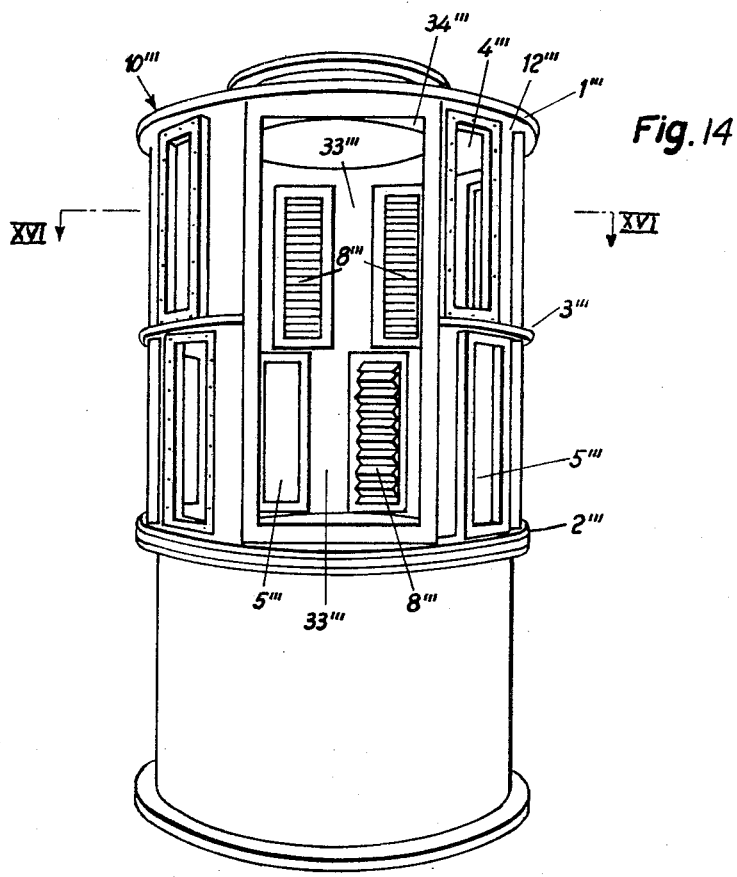
FIG. 14 is a perspective view of a machine casing or hollow body of still another embodiment of the invention.
Figure 15:
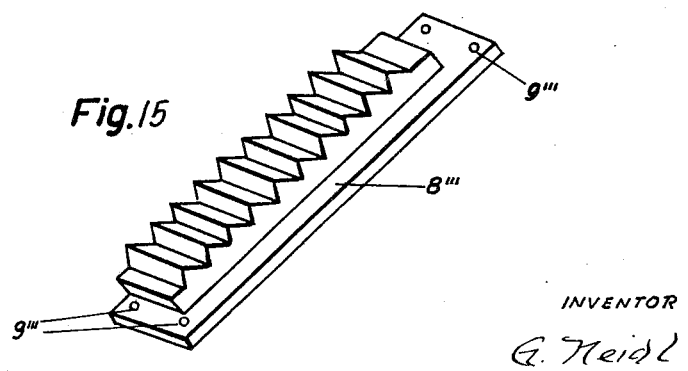
FIG. 15 is a perspective view, drawn to enlarged scale, of a member which has been removed from the hollow body member.

In the embodiment of FIGS. 14–16 the machine casing is formed by welding together several sheet metal parts. To reinforce the structure the cover plates 1''', 2''' overhang the external surfaces of the cylindrical casing and form a flange. Moreover, midway between the two cover or end plates 1''', 2''' the casing is embraced by a rib-like reinforced ring 3'''. Located in two zones above and below the reinforcing ring are rectangular windows 4''', 5''' in the cylindrical wall 12''' of casing 10'''. These windows 4''', 5''' are intended for the insertion therein of serrated fittings 8''' which are secured by bolts (not shown), said bolts passing through holes 9''' in the fitting (FIG. 15).

The cross-sectional view illustrated in FIG. 16 shows the tooth flanks 28''' of the serrated fittings 8''' which are curved in conformity with the internal curvatures of the cylinder wall and which are bolted by flanges 29''' to cylinder 12''' and by angles 30''' to covering plates 13'''. The bolts themselves are not shown in the drawing, but their position as indicated by the lines 14'''. Intermediate circularly arcuate segments 11''' are interposed between the serrated fittings 8''' and likewise bolted by flanges 31''' to cylinder 12''' and angles 32''' to covering plates 13'''. The intermediate members 11''' may be smooth as illustrated in the drawing, or they may be provided with annular grooves. In order to obtain special grinding or tearing effects it may be expedient to remove the intermediate members and thus to leave recessed portions 33''' (FIG. 14) between the serrated fittings 8'''. The object of the covering plates 13''' is to enclose the windows in casing 10''' from the outside. On one side of machine casing 10''' is a wide opening 34''' (FIG. 14) which extends from the top to the bottom. A horizontal delivery branch, not shown in the drawing, extends forwardly from this opening and tapers into a round pressure pipe and flange, likewise not shown in the drawing.

In operation the rows of circumferentially elongated teeth on the fittings 8''' are combed by teeth on the impeller or rotor.

While several forms of the invention have been described in order to enable those skilled in the art to obtain the full benefits of the new apparatus without difficulty, there is no intention to limit the scope of protection which it is desired to obtain by the grant of a patent to those forms of the invention described above. The invention covers all the modified forms of apparatus which those in the art will be able to devise without departing from the scope of the appended claims.

I claim:

1. A comminuting and pumping apparatus comprising a hollow body formed with a chamber having an axis, inlet orifice means lying along said axis and outlet orifice means remote from said axis; and a rotor plate journaled in said body for rotation about said axis, said plate being inclined to said axis for pumping flowable material through said chamber from said inlet orifice means to said outlet orifice means, said chamber being provided at its axial extremities with terminal wall portions extending generally transversely to said axis, each of said terminal wall portions being formed with at least one annular groove, said rotor being provided with tooth means receivable in said grooves.

2. An apparatus according to claim 1 wherein said chamber is formed with further annular grooves intermediate said terminal wall portions, said rotor being provided with teeth along its periphery receivable in respective ones of said further grooves while being of generally elliptical configuration with generally straight marginal portions adjacent said terminal wall portions of said chamber.

3. An apparatus according to claim 1 wherein said terminal wall portions are inwardly concave in axial cross-section.

4. An apparatus according to claim 1 wherein said annular grooves in said terminal wall portions of said chamber are discontinuous and form shearing edges cooperating with said tooth means.

References Cited in the file of this patent

UNITED STATES PATENTS

| 1,182,439 | Wood | May 9, 1916 |
| 1,439,365 | Hazell | Dec. 19, 1922 |
| 2,120,277 | Grierson | June 14, 1938 |
| 2,272,573 | Messmore | Feb. 10, 1942 |
| 2,336,798 | Nash | Dec. 14, 1943 |
| 2,501,275 | Heller | Mar. 21, 1950 |
| 3,005,597 | Neidl | Oct. 24, 1961 |

FOREIGN PATENTS

| 529,396 | Germany | July 14, 1931 |
| 533,751 | Belgium | Dec. 15, 1954 |

OTHER REFERENCES

Hoescher Maschinenfabrik Bulletin T.H.N. 3808 E, pages 3808 to 3814, March 1958.

Chemiker Zeitung, October 1958, No. 20, pages 740 to 744.